(12) United States Patent
Kimura et al.

(10) Patent No.: US 11,932,089 B2
(45) Date of Patent: Mar. 19, 2024

(54) VEHICLE DOOR FRAME

(71) Applicant: AISIN CORPORATION, Aichi (JP)

(72) Inventors: Jun Kimura, Kanagawa (JP); Takashi Kameyama, Kanagawa (JP)

(73) Assignee: AISIN CORPORATION, Aichi (JP)

( * ) Notice: Subject to any disclaimer, the term of this patent is extended or adjusted under 35 U.S.C. 154(b) by 472 days.

(21) Appl. No.: 17/274,867

(22) PCT Filed: Sep. 18, 2019

(86) PCT No.: PCT/JP2019/036621
§ 371 (c)(1),
(2) Date: Mar. 10, 2021

(87) PCT Pub. No.: WO2020/075463
PCT Pub. Date: Apr. 16, 2020

(65) Prior Publication Data
US 2022/0048368 A1 Feb. 17, 2022

(30) Foreign Application Priority Data
Oct. 10, 2018 (JP) ................. 2018-192127

(51) Int. Cl.
*B60J 5/04* (2006.01)
(52) U.S. Cl.
CPC .................. *B60J 5/0408* (2013.01)
(58) Field of Classification Search
CPC ............... B60J 5/0408; B60J 5/0402
See application file for complete search history.

(56) References Cited

U.S. PATENT DOCUMENTS

| 2011/0099912 | A1 | 5/2011 | Ohtake et al. | |
| 2014/0132028 | A1* | 5/2014 | Yamada | B23K 26/32 |
| | | | | 296/146.2 |
| 2017/0203638 | A1* | 7/2017 | Makita | B60J 5/0402 |
| 2018/0079286 | A1* | 3/2018 | Osawa | B60J 5/0402 |
| 2018/0117997 | A1* | 5/2018 | Otake | B60J 5/0468 |
| 2018/0134128 | A1* | 5/2018 | Takagi | B60J 5/0402 |
| 2022/0032748 | A1* | 2/2022 | Kimura | B60J 5/0402 |

FOREIGN PATENT DOCUMENTS

| JP | 2018047805 A | 3/2018 |
| JP | 2018070062 A | 5/2018 |
| WO | 2008123409 A1 | 10/2008 |

OTHER PUBLICATIONS

International Search Report (PCT/ISA/210) and translation and Written Opinion (PCT/ISA/237) dated Dec. 10, 2019, by the Japanese Patent Office as the International Searching Authority for International Application No. PCT/JP2019/036621.

\* cited by examiner

*Primary Examiner* — Amy R Weisberg
*Assistant Examiner* — Sara Laghlam
(74) *Attorney, Agent, or Firm* — BUCHANAN INGERSOLL & ROONEY PC (57) ABSTRACT

A vehicle door frame includes an upper frame having a first end face at a longitudinal end, and a lower external face; and a lower member of a plate form bonded to the upper frame. The lower member includes a second end face facing the first end face, a projection projecting from the second end face in a longitudinal direction below the upper frame, and a third end face located at an upper end of the projection, extending in the longitudinal direction, and facing a lower side of the external face of the upper frame.

5 Claims, 7 Drawing Sheets

VEHICLE DOOR FRAME

CROSS-REFERENCE TO RELATED APPLICATIONS

This application is a national stage application of International Application No. PCT/JP2019/036621, filed Sep. 18, 2019, which designates the United States, incorporated herein by reference, and which claims the benefit of priority from Japanese Patent Application No. 2018-192127, filed Oct. 10, 2018, the entire contents of which are incorporated herein by reference.

TECHNICAL FIELD

Embodiments described herein relate generally to a vehicle door frame.

BACKGROUND ART

Traditionally, vehicle door frames are known, which include, in a front part, an upper frame and a bracket being a lower member welded together. In such a vehicle door frame, the bracket includes a projection extending from an end face of the bracket along the lower face of the upper frame. The projection supports the upper frame from below.

In the vehicle door frame, the projection is made of a plate material by bending and the bent surface fronts the lower face of the upper frame. Because of this, it may be difficult to accurately form the part, of the projection, facing the lower face of the upper frame.

It is an object of the present invention to provide a vehicle door frame including a projection having a part facing the lower face of an upper frame accurately formed, for example.

SUMMARY

According to the present invention, for example, a vehicle door frame includes an upper frame having a first end face at a longitudinal end, and a lower external face; and a lower member of a plate form bonded to the upper frame. The lower member includes a second end face facing the first end face, a projection projecting from the second end face in a longitudinal direction below the upper frame, and a third end face located at an upper end of the projection, extending in the longitudinal direction, and facing a lower side of the external face of the upper frame.

According to the vehicle door frame as above, for example, the lower member has a fourth end face between the second end face and the third end face. A direction normal to the fourth end face in a cross-section orthogonal to the longitudinal direction gradually changes from a direction along the external face to an upward direction as approaching the third end face from the second end face.

According to the vehicle door frame as above, for example, the fourth end face and the external face are spaced from each other with a gap.

According to the vehicle door frame as above, for example, the lower member includes a first lower wall between the second end face and the fourth end face. The first lower wall extends along and below the external face.

According to the vehicle door frame as above, for example, the external face and the third end face are welded together.

According to the vehicle door frame as above, for example, the lower member includes a second lower wall extending along and below the external face and forming part of the second end face, and the second lower wall is provided with a cutout which is cut from the second end face in the longitudinal direction.

The vehicle door frame as above includes the plate-like lower member having the third end face facing the lower external face of the upper frame. It is thus possible to provide a vehicle door frame with a projection part of which is accurately formed, facing the lower face of the upper frame.

DESCRIPTION OF EMBODIMENT

The following will describe an exemplary embodiment of the present invention. The features of the embodiment to be described below and functions and results (effects) of such features are presented for illustrative purposes only. The present invention can be implemented by other features than those disclosed in the embodiment below. The present invention can attain at least one of the effects (including derivative effects) attainable by the features. Throughout the specification, ordinal numbers are used to distinguish parts, components, portions, positions, directions, and else for ease of discussion, and thus are not intended to indicate any priority or order.

For ease of explanation, directions are illustrated in the drawings. The letter X indicates the front side of a vehicle in the longitudinal direction, the letter Y indicates the right side of the vehicle in the lateral direction, and the letter Z indicates the upper side of the vehicle in the vertical direction. The longitudinal direction, the lateral direction, and the vertical direction of the vehicle intersect (are orthogonal to) one another.

In the specification, an end face refers to a cut surface of a solid object. The end face is however not limited to a cut (machined) surface. The end face may be a surface subjected to bending or polishing after cutting or machining, for example.

Figure 1:
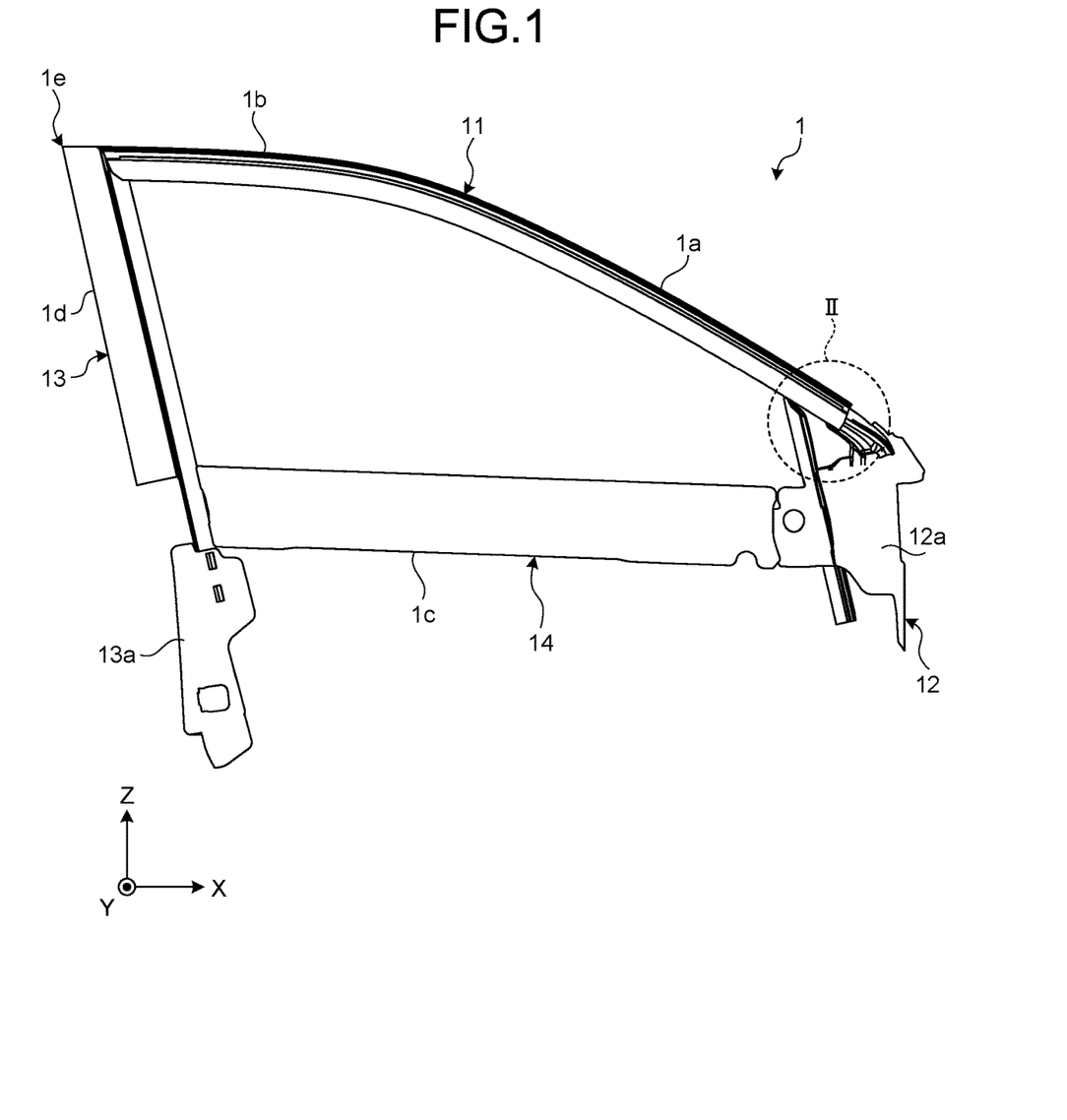
FIG. 1 is an exemplary schematic side view of a vehicle door frame according to an embodiment, as seen from inside a vehicle in the lateral direction.

FIG. 1 is a side view illustrating a front door frame 1, as seen from inside of the vehicle in the lateral direction. As illustrated in FIG. 1, the front door frame 1 includes an upper frame 11 forming a front edge 1a and an upper edge 1b, a lower member 12 forming a lower front part of the front door frame 1, a pillar 13 forming a rear edge 1d, and a waist reinforce 14 forming a lower edge 1c. The front door frame 1 is an example of a vehicle door frame.

The upper frame 11, the lower member 12, the pillar 13, and the waist reinforce 14 are made of, for example, a metal material such as aluminum alloy or ferrous material. The upper frame 11 may be formed of aluminum alloy by, for example, extrusion. The lower member 12, the pillar 13, and the waist reinforce 14 may be formed of a plurality of metal plates (plate-like member) by, for example, bending and bonding. The pillar 13 may be a molded part.

The front end (lower end) of the upper frame 11 and the upper end (rear end) of the lower member 12 are bonded together by welding. The upper frame 11 and the pillar 13 are bonded together by welding at an upper corner 1e.

The lower member 12 includes a fastening part 12a and the pillar 13 includes a fastening part 13a at their bottom parts. These fastening parts 12a and 13a are coupled to a door panel (not illustrated) by, for example, welding. The fastening parts 12a and 13a may be referred to as brackets. The fastening parts 12a and 13a work to increase the stiffness and strength of the door panel. In this regard, the fastening parts 12a and 13a may be referred to as a reinforcement.

Figure 2:
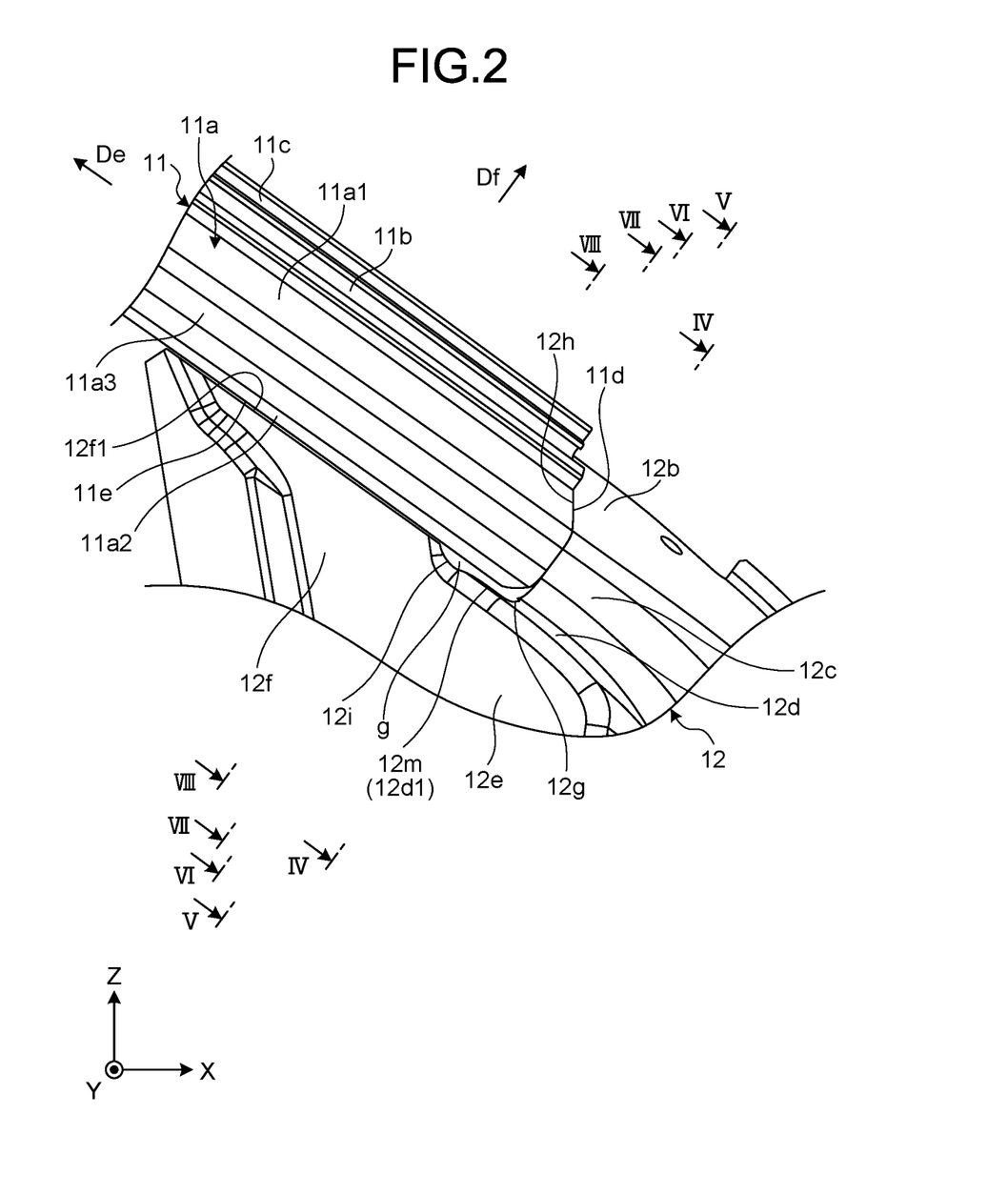
FIG. 2 is an exemplary enlarged schematic perspective view illustrating part II in FIG. 1.
Figure 3:
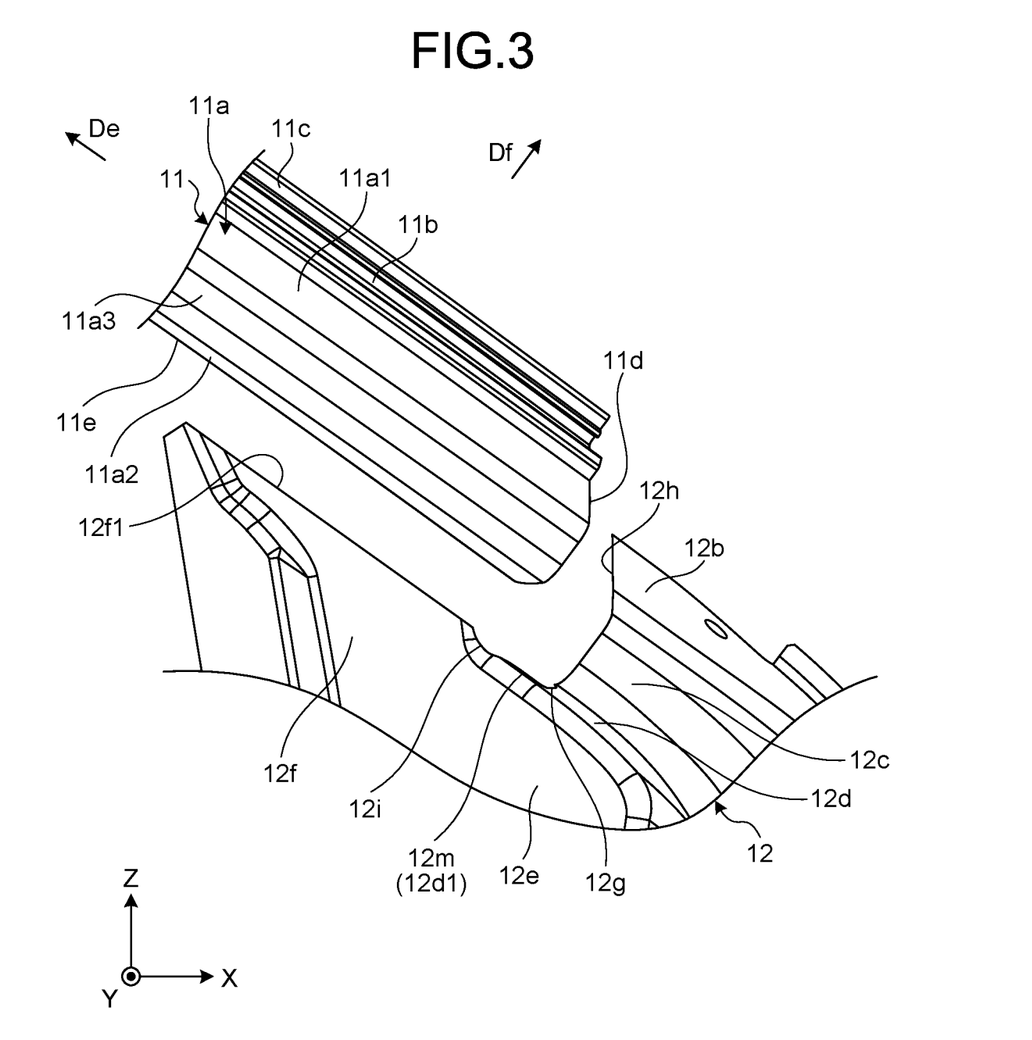
FIG. 3 is an exemplary exploded schematic perspective view of FIG. 2.

FIG. 2 is an enlarged perspective view illustrating part II in FIG. 1, that is, a connected part (joint) between the upper frame 11 and the lower member 12. FIG. 3 is an exploded perspective view of FIG. 2.

As illustrated in FIG. 2, the upper frame 11 extends upward and rearward, i.e., in a direction De. The direction De may be referred to as a longitudinal direction or an extending direction of the upper frame 11.

As illustrated in FIGS. 2 and 3, an end face 11d of the upper frame 11 abuts an end face 12h of the lower member 12. The end face 11d faces in a direction opposite to the direction De, and the end face 12h faces in the direction De. The end face 11d is an example of a first end face, and the end face 12h is an example of a second end face.

A lower external face lie of the upper frame 11 is supported by a projection 12f projecting from the lower member 12 in the direction De. In other words, the projection 12f projects in the direction De along the external face lie.

An upper end face 12f1 of the projection 12f faces the external face lie. The direction normal to the end face 12f1 is substantially opposite to the direction normal to the external face lie, but is not limited thereto. In the present embodiment, the external face lie and the end face 12f1 may be bonded together by welding such as fillet welding. The end face 12f1 is an example of a third end face.

Figure 4:
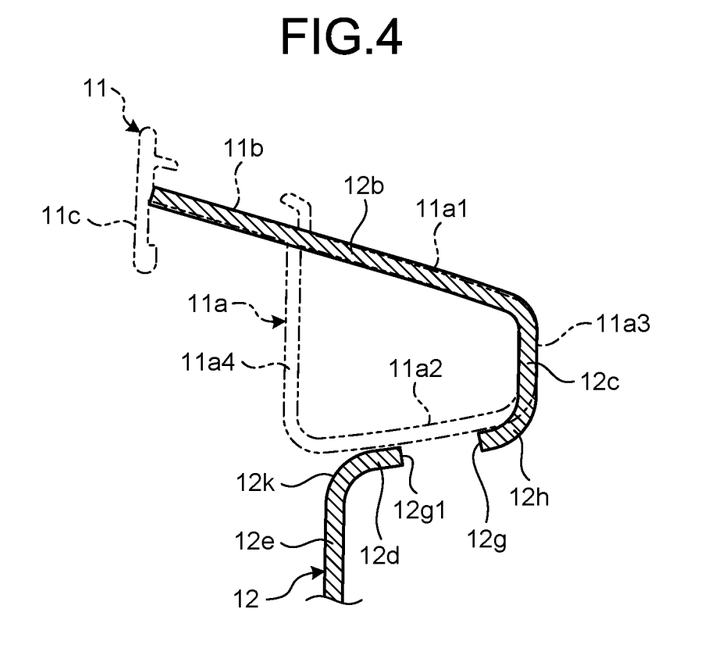
FIG. 4 is a cross-sectional view taken along line IV-IV in FIG. 2.
Figure 5:
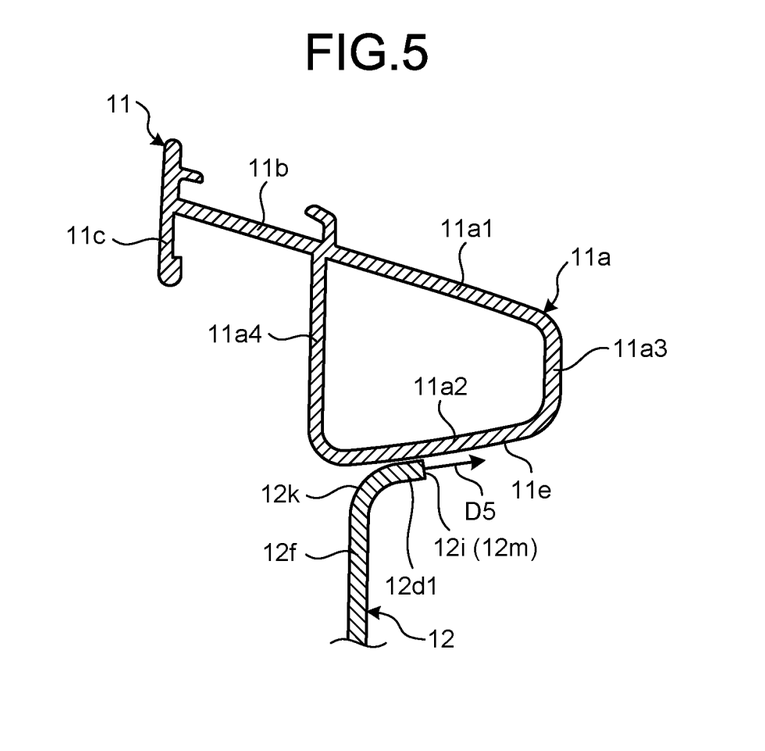
FIG. 5 is a cross-sectional view taken along line V-V in FIG. 2.
Figure 6:
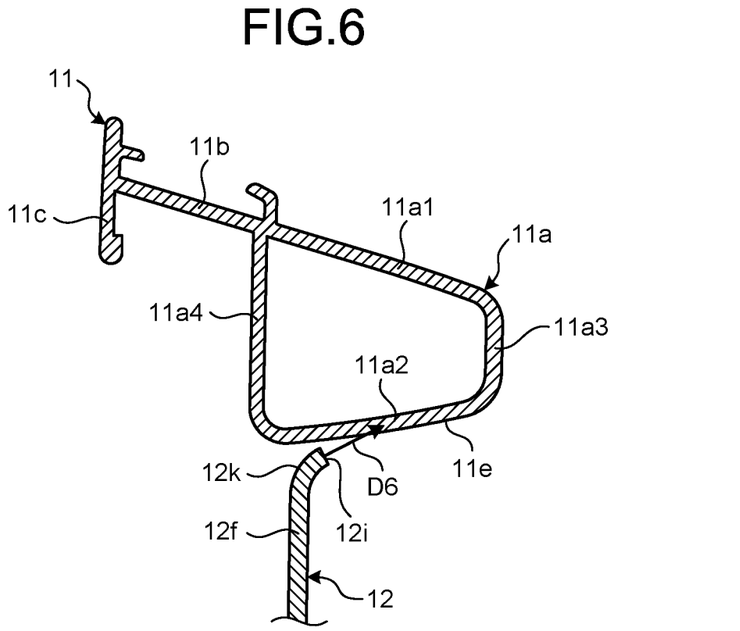
FIG. 6 is a cross-sectional view taken along line VI-VI in FIG. 2.
Figure 7:
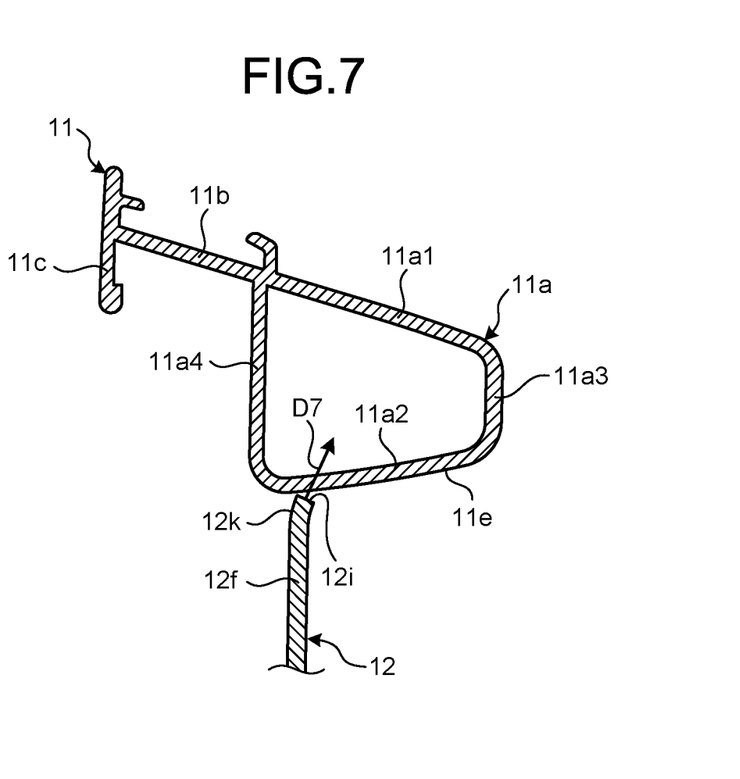
FIG. 7 is a cross-sectional view taken along line VII-VII in FIG. 2.
Figure 8:
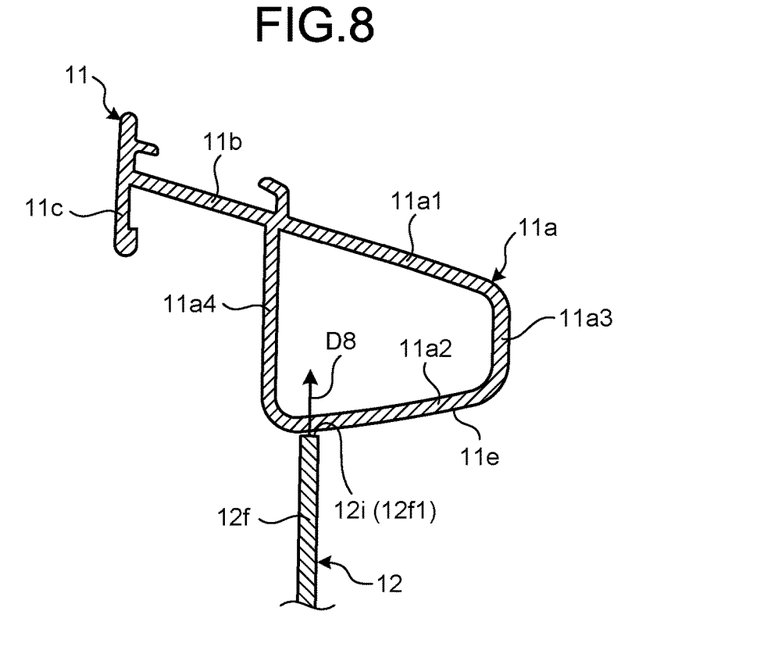
FIG. 8 is a cross-sectional view taken along line VIII-VIII in FIG. 2.

FIG. 4 is a cross-sectional view taken along line IV-IV in FIG. 2. FIG. 5 is a cross-sectional view taken along line V-V in FIG. 2. FIG. 6 is a cross-sectional view taken along line VI-VI in FIG. 2. FIG. 7 is a cross-sectional view taken along line VII-VII in FIG. 2. FIG. 8 is a cross-sectional view taken along line VIII-VIII in FIG. 2.

As illustrated in FIG. 5, the upper frame 11 includes a closed section 11a, a bridging wall 11b, and an upright wall 11c. The closed section 11a includes an upper wall 11a1, a lower wall 11a2, an inner wall 11a3, and an external wall 11a4. The bridging wall 11b adjoins the closed section 11a from outside in the lateral direction of the vehicle. The upright wall 11c adjoins the bridging wall 11b from outside in the lateral direction of the vehicle. The upper wall 11a1 of the closed section 11a and the bridging wall 11b extend contiguously. The upper wall 11a1 and the bridging wall 11b are slightly inclined relative to the lateral direction of the vehicle, extending externally upward in the lateral direction. The laterally outside end of the bridging wall 11b is connected to a vertically intermediate part of the upright wall 11c. In other words, the bridging wall 11b and the upright wall 11c form a substantially T-shaped cross-section.

As illustrated in FIGS. 2 and 4, the lower member 12 includes a bridging wall 12b, an inner wall 12c, a lower wall 12d, an upright wall 12e, and the projection 12f. The bridging wall 12b adjoins the upper wall 11a1 and the bridging wall 11b of the upper frame 11. The bridging wall 12b is flush with the upper wall 11a1 and the bridging wall 11b, extending together in the direction opposite to the direction De. The inner wall 12c adjoins the inner wall 11a3 of the upper frame 11. The inner wall 12c is flush with the inner wall 11a3, extending together in the direction opposite to the direction De. The lower wall 12d is located below the lower wall 11a2 of the upper frame 11 by the thickness of the lower wall 12d and extends in the direction De. The lower wall 12d is provided with a cutout 12g at an end (end face 12h) in the direction De. The cutout 12g is recessed in the direction opposite to the direction De. The end face 12h of the lower member 12 faces the end face 11d of the upper frame 11 opposite to the direction De and includes an end of the bridging wall 12b in the direction De, an end of the inner wall 12c in the direction De, and an end of the lower wall 12d closer to the inner wall 12c than the cutout 12g. The lower member 12 is provided with a bend 12k between the upright wall 12e and the lower wall 12d. The upright wall 12e extends in a direction substantially crossing the lateral direction of the vehicle. The upright wall 12e adjoins the projection 12f. The upright wall 12e is contiguous with the projection 12f, forming a single wall. The projection 12f also extends in a direction substantially crossing the lateral direction of the vehicle. The lower wall 12d is an example of a second lower wall, and the end face 12h is an example of a second end face.

As illustrated in FIG. 2, the end face 12h of the lower member 12 faces in the direction De while the end face 12f1 faces in a direction Df (diagonally upward) orthogonal to the direction De and the lateral direction of the vehicle. To achieve this disposition in the present embodiment, an end face 12i located between the end face 12f1 and the end face 12h is twisted. Specifically, as illustrated in FIGS. 5 to 8, the direction normal to the end face 12i, in the cross-section of the lower member 12 orthogonal to the direction De, gradually changes to a direction D8 (FIG. 8, for example, upward) from a direction D5 (FIG. 5) along the external face lie, a direction D6 (FIG. 6), and a direction D7 (FIG. 7) as approaching the end face 12f1 from the end face 12h. In other words, the direction normal to the end face 12i gradually changes from the direction D5 along the external face lie to the upward direction. The end face 12i and the external face lie are spaced from each other with a gap g. The gap g serves to facilitate the molding of the end face 12i having a varying normal direction, as compared with that with no gap g. The end face 12f1 and the external face lie may be spaced from each other with a second gap (not illustrated). In such a case the second gap is set to smaller (narrower) than the gap g. The end face 12*i* is an example of a fourth end face.

Figure 9:
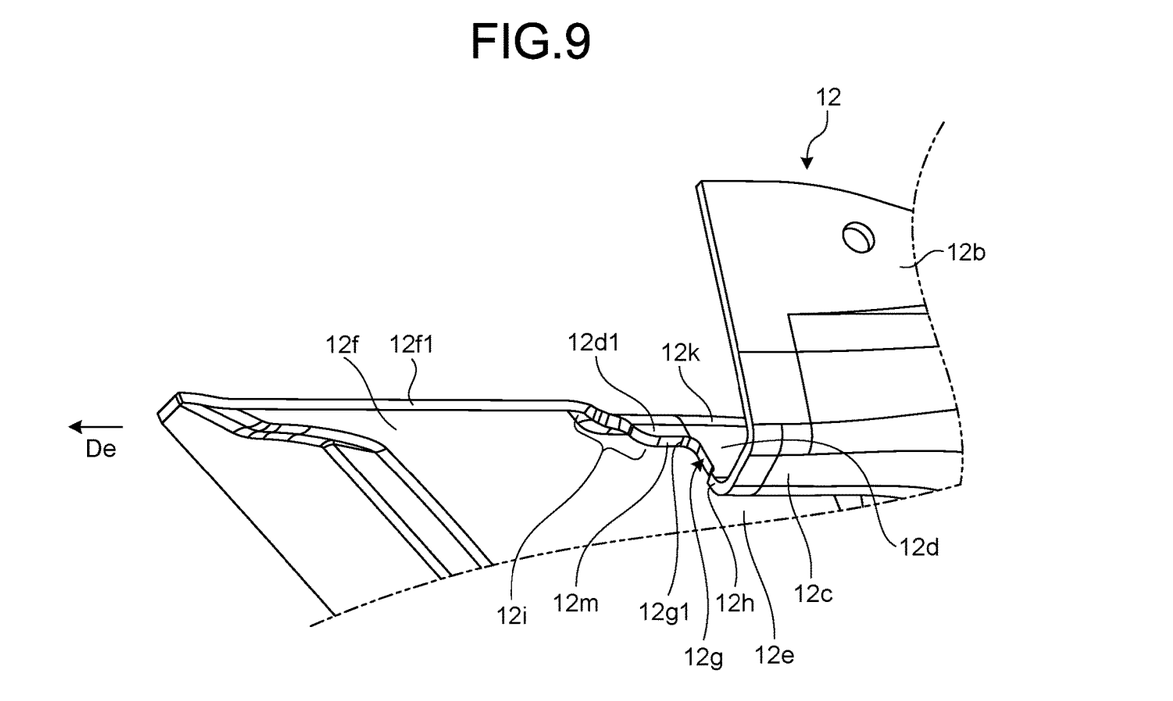
FIG. 9 is an exemplary schematic perspective view illustrating end faces of a lower member according to the embodiment.
Figure 10:
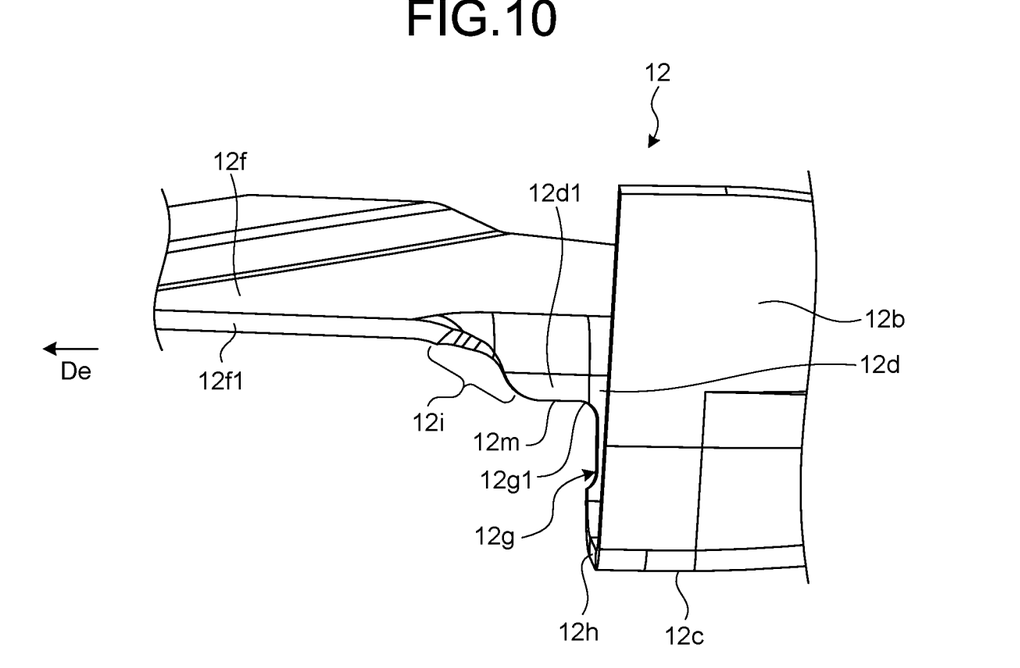
FIG. 10 is an exemplary schematic perspective view illustrating the end faces of the lower member according to the embodiment, as seen in a direction different from the direction in FIG. 9.

FIG. 9 is a perspective view illustrating the end faces 12*f*1, 12*h*, and 12*i* of the lower member in the direction De. FIG. 10 is a perspective view illustrating the end faces 12*f*1, 12*h*, and 12*i* of the lower member, as seen in a direction different from the direction in FIG. 9.

As illustrated in FIGS. 9 and 10, the lower wall 12*d* includes an adjoining part 12*d*1 adjacent to the bend 12*k*. The adjoining part 12*d*1 is a long narrow part projecting from the end face 12*h* in the direction De. In the lateral direction of the vehicle, an outside end face 12*m* of the adjoining part 12*d*1 is contiguous and substantially flush with a side face 12*g*1 of the cutout 12*g* close to the bend 12*k*. The end face 12*m* and the side face 12*g*1 face in a direction crossing the direction De and along the external face lie of the upper frame 11. As illustrated in FIG. 2, the adjoining part 12*d*1 is located between the end face 12*h* and the end face 12*i*, extending in the direction De along and below the external face lie of the upper frame 11. In this structure, sealant (sealing agent) applied to the gap between the upper frame 11 and the lower member 12 may also enter in the gap between the adjoining part 12*d*1 and the external face lie of the upper frame 11. Thus, this structure can facilitate application and secure retention of the sealant compared with a structure without the adjoining part 12*d*1. The adjoining part 12*d*1 is an example of a first lower wall.

As illustrated in FIGS. 9 and 10, the end face 12*i* is located between the end face 12*m* and the end face 12*f*1. As illustrated in FIG. 10 and FIGS. 5 to 8, in the direction De, between the end face 12*m* and the end face 12*f*1, the end face 12*i* extends in a twisted manner from the direction D5 along the external face lie to the direction D8 substantially orthogonal to the external face lie. If the twisted end face 12*i* having a varying normal direction changes between the end face 12*h* facing in the direction De and the end face 12*f*1, the end face 12*i* may be curved and twisted. Thus, the form of the end face 12*i* may be more complicated, which causes difficulty in accurately forming the end face 12*i*. In this regard, in the present embodiment the adjoining part 12*d*1 is provided so that the end face 12*i* is located between the end face 12*m* of the adjoining part 12*d*1, facing in the direction D5 orthogonal to the direction De and along the external face lie, and the end face 12*f*1 of the projection 12*f* facing in the direction D8 (upward, for example) orthogonal to the direction De and substantially orthogonal to the external face lie. This arrangement can decrease the amount of bending of the end face 12*i* compared with the end face 12*i* extending from the end face 12*h* to the end face 12*f*1. This can simplify the form of the end face 12*i* and allows accurate formation of the end face 12*i*. Thus, the gap between the external face lie of the upper frame 11 and the end face 12*i* can be decreased, for example.

Figure 11:
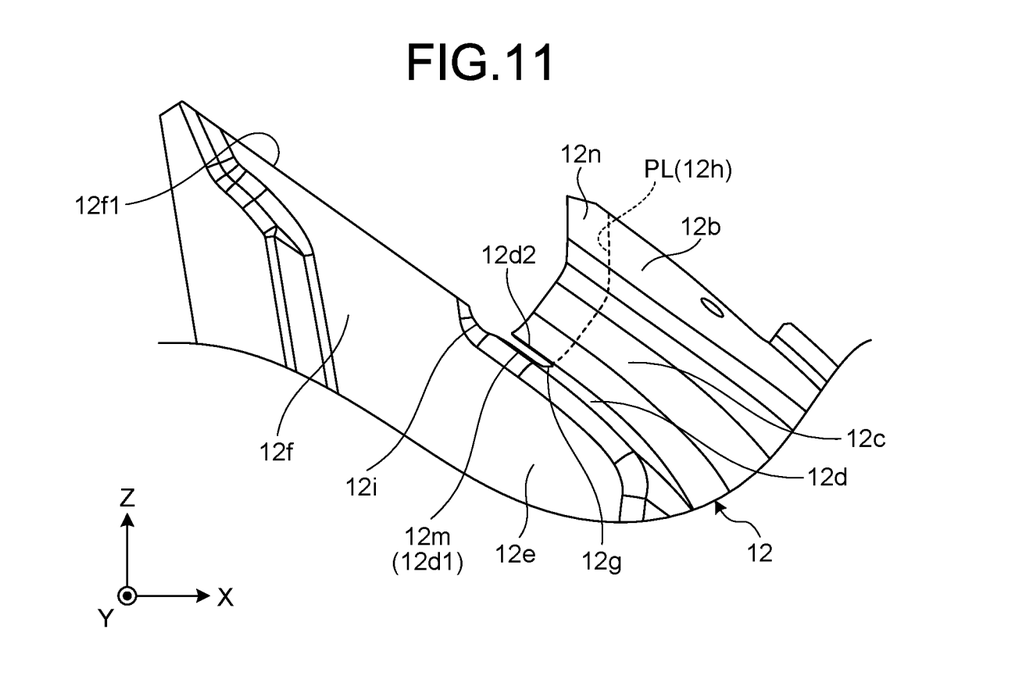
FIG. 11 is an exemplary schematic perspective view illustrating the lower member according to the embodiment before machining a second end face of the lower member, as seen in the same direction as in FIG. 2.

FIG. 11 is a perspective view illustrating the lower member 12 before machining the end face 12*h*. As illustrated in FIG. 11, of the bridging wall 12*b*, the inner wall 12*c*, and the lower wall 12*d* of the lower member 12, a tip portion 12*n* of a part 12*d*2 located closer to the inner wall 12*c* than the cutout 12*g* in the direction De, is cut off at a cutting position PL. The resulting cross-section is to be the end face 12*h*.

In the case of forming the end faces 12*h* by press molding, the end faces 12*h* are subjected to bending or bonding after the press molding, which may slightly bend the end faces 12*h*. In addition, the end faces 12*h* may exhibit different degrees of planarity. It is thus difficult to ensure accurate planarity of the end faces 12*h*, considering the deformation caused by such post-processing and variations in the deformation. However, the tip portion 12*n* can be cut in the final stage of the manufacture process of the lower member 12, which leads to ensure the planarity of the cross-section, i.e., the end face 12*h*. After cutting, the tip portion 12*n* can be subjected to finishing process such as debarring or polishing as appropriate.

Moreover, without the cutout 12*g*, it may be difficult to set the stop position of a cutting tool (not illustrated) that moves from the opposite side of the projection 12*f*, that is, descends from the upper right to the lower left in FIG. 11, which may cause the cross-section to reach the projection 12*f* or the upright wall 12*e* and damage it.

In this regard, according to the present embodiment the cutting tool can be easily stopped at the location of the cutout 12*g*, which can avoid damaging the projection 12*f* or the upright wall 12*e*. In other words, according to the present embodiment, the cutout 12*g* works to facilitate forming the end face 12*h* more accurately by cutting the tip portion 12*n*. Moreover, the end face 12*h* can be set at a position in accordance with, for example, variations in the upper frame 11 or the lower member 12 after manufacture.

As described above, the lower member 12 according to the present embodiment includes the projection 12*f* having the end face 12*f*1 (third end face) facing the lower external face lie of the upper frame 11. If the front or back surface of the bend-molded, plate-like lower member 12 faces the external face lie, it may be difficult to accurately form the surface (i.e., front or back surface) facing the external face lie. According to the present embodiment, however, the external face lie faces the end face 12*f*1 of the projection 12*f* of the lower member 12 being a plate, which enables the end face 12*f*1 to be more accurately formed, for example. Thus, the end face 12*f*1 and the external face lie can abut on each other more accurately. This leads to facilitating, for example, welding between the external face lie and the end face 12*f*1, and enables improvement in the sealing performance of the sealant in the case of no welding therebetween.

In the present embodiment, while approaching the end face 12*f*1 from the end face 12*h*, the direction normal to the end face 12*i* (fourth end face) in the cross-section orthogonal to the direction De (longitudinal direction) gradually changes from the direction D5 (direction along the external face lie) to the direction D8 (upward). Owing to such a structure, for example, it is possible to provide the lower member 12 of a relatively simple structure having the end face 12*f*1 of the projection 12*f* facing the external face lie of the upper frame 11 in addition to the end face 12*h*.

In the present embodiment, the end face 12*i* (fourth end face) and the external face lie are spaced from each other with the gap g. This configuration facilitates, for example, the molding of the end face 12*i* having a varying normal direction, as compared with a configuration without the gap g.

In the present embodiment, the lower member 12 includes the adjoining part 12*d*1 (first lower wall) located between the end face 12*h* (second end face) and the end face 12*f*1 (third end face) and extending along and below the external face lie. Owing to this structure, for example, it is possible to provide the lower member 12 of a relatively simple structure having the end face 12*i* (fourth end face), and allow the sealant to remain in the gap between the upper frame 11 and the lower member 12.

In the present embodiment, the external face lie and the end face 12*f*1 (third end face) may be welded together. This structure can increase, for example, the stiffness and strength of the joint between the upper frame 11 and the lower member 12, as compared with the external face 1*e* and the end face 12*f*1 not welded together.

In the present embodiment, the lower wall 12*d* (second lower wall) is provided with the cutout 12*g* cut from the end face 12*h* in the direction opposite to the direction De. Owing to such a structure, for example, it is possible to prevent the projection 12*f* or the upright wall 12*e* from being cut at the time of cutting the tip portion 12*n*.

While certain embodiments have been described, these embodiments have been presented by way of example only, and are not intended to limit the scope of the inventions. Indeed, the embodiments described herein may be embodied in different other forms; various omissions, substitutions, combinations, and changes may be made without departing from the spirit of the inventions. These embodiments and modifications are incorporated in the scope and spirit of the inventions and in the accompanying claims and their equivalents. Specifications of the elements and shapes (structure, kind, direction, form, size, length, width, thickness, height, number, arrangement, position, location, material, etc.) can be modified and carried out as appropriate.

The invention claimed is:

1. A vehicle door frame comprising:
    an upper frame having a first end face at a longitudinal end, and a lower external face; and
    a lower member of a plate form bonded to the upper frame, the lower member including:
        a second end face facing the first end face,
        a projection projecting from the second end face in a longitudinal direction below the upper frame, and
        a third end face located at an upper end of the projection, extending in the longitudinal direction, and facing a lower side of the external face of the upper frame,
    wherein
    the lower member has a fourth end face between the second end face and the third end face, and
    a direction normal to the fourth end face in a cross-section orthogonal to the longitudinal direction gradually changes from a direction along the external face to an upward direction as approaching the third end face from the second end face.

2. The vehicle door frame according to claim 1, wherein the fourth end face and the external face are spaced from each other with a gap.

3. The vehicle door frame according to claim 1, wherein the lower member includes a first lower wall between the second end face and the fourth end face, the first lower wall extending along and below the external face.

4. The vehicle door frame according to claim 1, wherein the external face and the third end face are welded together.

5. The vehicle door frame according to claim 1, wherein the lower member includes a second lower wall extending along and below the external face and forming part of the second end face, and
the second lower wall is provided with a cutout which is cut from the second end face in the longitudinal direction.

* * * * *